United States Patent [19]

Eldin et al.

[11] Patent Number: 5,789,482
[45] Date of Patent: Aug. 4, 1998

[54] EPOXY RESIN WITH ANHYDRIDE, TOUGHENER AND ACTIVE HYDROGEN-CONTAINING COMPOUND

[75] Inventors: Sameer H. Eldin, Fribourg; Jürg Maurer, Riehen; Robert Peter Peyer, Lausen; Peter Grieshaber, Zumholz; François Rime, Marly, all of Switzerland

[73] Assignee: Ciba Specialty Chemicals Corporation, Tarrytown, N.Y.

[21] Appl. No.: 952,122

[22] Filed: Sep. 28, 1992

Related U.S. Application Data

[63] Continuation-in-part of Ser. No. 674,637, Mar. 25, 1991, abandoned.

[30] Foreign Application Priority Data

Mar. 30, 1990 [CH] Switzerland ............... 1055/90

[51] Int. Cl.$^6$ .............. C08L 63/00; C08L 63/02; C08L 63/04
[52] U.S. Cl. .............. 525/65; 523/457; 523/467; 525/502; 525/533
[58] Field of Search ............. 525/65, 457, 467, 525/502, 533

[56] References Cited

U.S. PATENT DOCUMENTS

| | | | |
|---|---|---|---|
| 3,856,883 | 12/1974 | Dickie et al. ................ | 260/836 |
| 4,668,736 | 5/1987 | Robins et al. ................ | 525/65 |
| 4,778,851 | 10/1988 | Henton et al. ................ | 525/65 |
| 4,846,905 | 7/1989 | Tarbutton et al. ............. | 525/65 |
| 4,894,413 | 1/1990 | Catsiff et al. ................ | 525/65 |
| 4,983,672 | 1/1991 | Almer et al. ................ | 525/65 |

FOREIGN PATENT DOCUMENTS

| 191872 | 8/1986 | European Pat. Off. . |
|---|---|---|
| 245018 | 11/1987 | European Pat. Off. . |

OTHER PUBLICATIONS

Lee and Neville, *Handbook of Epoxy Resins*, McGraw-Hill Book Co., NY, NY, 1967, pp. 12-1 to 12-37.

*Primary Examiner*—Robert E. Sellers
*Attorney, Agent, or Firm*—David R. Chrichton

[57] ABSTRACT

Epoxy resin compositions which contain a) at least one epoxy resin containing, on average, more than one 1,2-epoxy group per molecule,
b) an anhydride hardener for the epoxy resin a),
c) a toughener, and
d) a compound containing two active hydrogen atoms which is capable of reacting with the epoxy resin a)

have an outstanding toughness and are suitable as casting resins, laminating resins, moulding compounds, coating compounds and encapsulation systems for electrical and electronic components.

19 Claims, No Drawings

EPOXY RESIN WITH ANHYDRIDE, TOUGHENER AND ACTIVE HYDROGEN-CONTAINING COMPOUND

This is a continuation-in-part of application Ser. No. 674,637, filed Mar. 25, 1991, now abandoned.

The present invention relates to epoxy resin compositions modified with tougheners, the products obtained therefrom by curing, a method for improving the toughness of epoxy resins and also novel tougheners.

In the cured state, epoxy resins have in general excellent mechanical and chemical properties such as, for example, good heat resistance, hardness, dimensional stability, electrical properties and chemical resistance. However, typical epoxy thermosetting materials do not meet the requirements imposed on them relating to toughness and they tend to be brittle.

Attempts have already been made to improve this deficiency by incorporating elastomeric material into epoxy resins. Thus, EP-A 245 018 describes storage-stable, thermocurable epoxy resin compositions as adhesives which contain polymers having a rubber-soft and a thermoplastic phase as tougheners. Suitable materials are carboxyl-terminated butadiene/acrylonitrile rubbers, graft polymers, for example methacrylate/butadiene/styrene polymers and so-called core/shell polymers which have a soft core and a hard shell. The best toughness is obtained by combining carboxyl-terminated butadiene/acrylonitrile rubber with core/shell polymers. Furthermore, U.S. Pat. No. 3,856,883 discloses a method of improving the impact strength and the fatigue properties in thermosetting materials, for example epoxy-, carboxyl- or hydroxyl-functional resins, melamine/formaldehyde or phenol/formaldehyde resins. In this publication, core/shell polymers having a soft acrylate core and a hard shell which has an epoxy, carboxyl or hydroxyl functionality, is incorporated into the resin prepolymer and cured at the same time.

U.S. Pat. No. 4,778,851 furthermore describes an epoxy resin composition having good toughness and heat resistance which contains a discontinuous phase made of graft rubber particles in the epoxy resin phase. These particles have a core/shell structure, with an elastomeric core which is insoluble in the epoxy resin and a shell which has groups which react with the epoxy groups of the resin.

These epoxy resins having improved toughness do not, however, always meet the requirements which are imposed today on casting resin formulations based on epoxy resin, in particular in electrical engineering.

It has now been found, surprisingly, that adding a toughener combined with a compound containing two active hydrogen atoms improves both the toughness and the other mechanical properties of an epoxy resin markedly.

The present invention relates to an epoxy resin composition which comprises a) at least one epoxy resin containing on average more than one 1,2-epoxy group per molecule, b) an anhydride hardener for the epoxy resin a), c) a toughener, and d) a compound containing two active hydrogen atoms which is capable of reacting with the epoxy resin a).

Suitable epoxy resins which can be used according to the invention are all types of epoxy resins such as, for example, those which contain groups of the formula

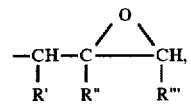

directly bound to oxygen, nitrogen or sulfur atoms, in which formula either R' and R''' are each a hydrogen atom, in which case R" then denotes a hydrogen atom or a methyl group, or R' and R''' are together —CH$_2$CH$_2$— or —CH$_2$CH$_2$CH$_2$—, in which case R" denotes a hydrogen atom.

As examples of such resins, mention may be made of polyglycidyl and poly(β-methyl)glycidyl esters which can be obtained by reacting a compound containing two or more carboxylic acid groups per molecule with epichlorohydrin, glycerol dichlorohydrin or β-methylepichlorohydrin in the presence of alkali. Such polyglycidyl esters can be derived from aliphatic polycarboxylic acids, for example oxalic acid, succinic acid, glutaric acid, adipic acid, pimelic acid, suberic acid, azelaic acid, sebacic acid or dimerised or trimerised linolic acid, from cycloaliphatic polycarboxylic acids such as tetrahydrophthalic acid, 4-methyltetrahydrophthalic acid, hexahydrophthalic acid and 4-methylhexahydrophthalic acid and from aromatic polycarboxylic acids such as phthalic acid, isophthalic acid and terephthalic acid.

Other examples are polyglycidyl and poly(β-methylglycidyl) ethers which can be obtained by reacting a compound containing at least two free alcoholic and/or phenolic hydroxyl groups per molecule with the corresponding epichlorohydrin under alkaline conditions or, alternatively, in the presence of an acidic catalyst with subsequent alkali treatment. These ethers can be prepared with poly(epichlorohydrin) from acyclic alcohols such as ethylene glycol, diethylene glycol and higher poly (oxyethylene) glycols, propane-1,2-diol and poly (oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol and sorbitol, from cycloaliphatic alcohols such as resorcitol, quinitol, bis(4-hydroxycyclohexyl)methane, 2,2-bis(4-hydroxycyclohexyl) propane and 1,1-bis(hydroxymethyl)-3-cyclohexene and from alcohols containing aromatic nuclei such as N,N-bis (2-hydroxyethyl)aniline and p,p'-bis(2-hydroxyethylamino) diphenylmethane. They can furthermore be prepared from mononuclear phenols such as resorcinol and hydroquinone, and also polynuclear phenols such as bis(4-hydroxyphenyl) methane, 4,4-dihydroxydiphenyl, bis(4-hydroxyphenyl) sulfone, 1,1,2,2-tetrakis(4-hydroxyphenyl)ethane, 2,2-bis(4-hydroxyphenyl)propane (otherwise known as bisphenol A) and 2,2-bis(3,5-dibromo-4-hydroxyphenyl)propane, and also from aldehydes such as formaldehyde, acetaldehyde, chloral and furfural, and novolaks formed with phenols such as phenol itself and phenols ring-substituted by chlorine atoms or alkyl groups containing up to nine carbon atoms in each case such as 4-chlorophenol, 2-methylphenol and 4-tert-butylphenol.

Poly(N-glycidyl) compounds include, for example, those which are obtained by dehydrochlorination of the reaction products of epichlorohydrin with amines containing at least two amino hydrogen atoms such as aniline, n-butylamine, bis(4-aminophenyl)methane and bis(4-methylaminophenyl) methane, and triglycidyl isocyanurate and also N,N'-diglycidyl derivatives of cyclic alkylene ureas such as ethylene urea and 1,3-propylene urea, and hydantoins such as 5,5-dimethylhydantoin.

Poly(S-glycidyl) compounds are, for example, the di-S-glycidyl derivatives of dithiols such as ethane-1,2-dithiol and bis(4-mercaptomethylphenyl) ether.

Examples of epoxy resins containing groups of the formula

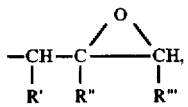

in which R' and R''' together denote a —CH₂CH₂— or a —CH₁-CH₂-CH₂— group are bis(2,3-epoxycyclopentyl) ether, 2,3-epoxycyclopentyl glycidyl ether, 1,2-bis(2,3-epoxycyclopentyloxy)ethane and 3,4-epoxycyclohexylmethyl 3',4'-epoxycyclohexanecarboxylate.

Also suitable are epoxy resins in which the 1,2-epoxy groups are bound to hetero atoms of various kinds, for example the N,N,O-triglycidyl derivative of 4-aminophenol, the glycidyl ether/glycidyl ester of salicylic acid or p-hydroxybenzoic acid, N-glycidyl-N'-((2-glycidyloxypropyl)-5,5-dimethylhydantoin and 2-glycidyloxy-1,3-bis(5,5-dimethyl-1-glycidyl-3-hydantoinyl)propane.

If desired, epoxy resin mixtures can be used.

Preferred are epoxy resins based on bisphenol A, bisphenol F or a cycloaliphatic diepoxide or polyglycidyl esters of polycarboxylic acids, in particular those which contain, on average, two 1,2-epoxy groups per molecule.

Bisphenol A diglycidylether, 3,4-epoxycyclohexylmethyl-3',4'-epoxycyclohexanecarboxylate and hexahydrophthalic acid diglycidyl ester are particularly preferred epoxy resins.

Very particularly preferred are liquid and low-viscosity epoxy resins. Expediently the viscosity at 25° C. does not exceed a value of 20,000 mPa·s.

In principle, all anhydrides of difunctional and higher-functional carboxylic acids, for example linear aliphatic polymeric anhydrides, for example polysebacic acid polyanhydride or polyazelaic acid polyanhydride or cyclic carboxylic acid anhydrides, the latter being preferred, may be suitable as anhydride hardeners.

Cyclic carboxylic acid anhydrides are preferably an alicyclic monocyclic or polycyclic anhydride, an aromatic anhydride or a chlorinated or brominated anhydride.

Examples of alicyclic monocyclic anhydrides are: succinic anhydride, citraconic anhydride, itaconic anhydride, alkenyl-substituted succinic anhydrides, dodecenylsuccinic anhydride, maleic anhydride and tricarballylic anhydride.

Examples of alicyclic polycyclic anhydrides are: maleic anhydride adduct of methylcyclopentadiene, linolic acid adduct of maleic anhydride, alkylated endoalkylenetetrahydrophthalic anhydride, methyltetrahydrophthalic anhydride, tetrahydrophthalic anhydride, the isomer mixtures of the last two being particularly suitable. Also preferred is hexahydrophthalic anhydride.

Examples of aromatic anhydrides are: pyromellitic dianhydride, trimellitic anhydride and phthalic anhydride.

Examples of chlorinated or brominated anhydrides are: tetrachlorophthalic anhydride, tetrabromophthalic anhydride, dichloromaleic anhydride and chlorendic anhydride.

Preferably, liquid or readily melting dicarboxylic acid anhydrides are used in the compositions according to the invention.

Preferred are compositions containing an alicyclic single-ring or multi-ring anhydride, in particular Nadic Methyl Anhydride, hexahydrophthalic anhydride, methyltetrahydrophthalic anhydride and its isomer mixture.

If desired, the anhydride hardener can be used in combination with a standard reaction accelerator for anhydride hardeners. The reaction accelerator can be incorporated in the composition simultaneously with the anhydride hardener or, to prolong the service life, added to the composition just before curing. Preferably, addition takes place just shortly before curing.

Preferably, the anhydride hardener is used in combination with the reaction accelerator.

Suitable reaction accelerators are, for example, tertiary amines, metal salts of carboxylic acids, metal chelates or organophosphines.

Preferred are the tertiary amines, in particular substituted imidazoles.

Benzyldimethylamine and 1-methylimidazole are particularly preferred.

Suitable tougheners for the compositions according to the invention are the elastomers known to the person skilled in the art as "rubber tougheners" or elastomers containing graft polymers, provided they form a second dispersed phase in the epoxy resin composition according to the invention in the cured state.

At the same time, the tougheners may be liquid or solid in the initial state.

Liquid tougheners form a homogeneous phase in the composition according to the invention in the uncured state.

Liquid tougheners can also be used as pre-adducts with, for example, epoxy resins.

Examples of such liquid tougheners are carboxyl-terminated butadiene/acrylonitrile copolymers such as those described, for example, in EP-A 245 018.

Solid tougheners include graft polymers such as those described, for example, in U.S. Pat. No. 3,496,250 and also core/shell polymers such as those disclosed in EP-A 45 357 and U.S. Pat. No. 4,419,496.

Examples of graft polymers are methacrylate/butadiene/styrene, acrylate/methacrylate/butadiene/styrene or acrylonitrile/butadiene/styrene polymers.

Core/shell polymers have, as a rule, a soft core made of an elastomeric material which is insoluble in the epoxy resin. Grafted on to the latter is a shell of polymeric material which may have a functionality which is either reactive or non-reactive with epoxy groups.

Examples of elastomers which can be used as core material are polybutadiene, polysulfides, acrylic rubber, butyl rubber or isoprene elastomer. Preferably, the core material contains polybutadiene.

Examples of polymeric shell materials are polystyrene, polyacrylonitrile, methacrylate/acrylic acid copolymers, polymethyl methacrylate or styrene/acrylonitrile/glycidyl methacrylate copolymers. Preferably polymethyl methacrylate is used as the shell material.

The size of such core/shell particles is expediently 0.05–30 µm, preferably 0.05–15 µm.

Preferred are core/shell polymers having a shell which is non-reactive with epoxy groups.

Some of the core/shell polymers, for example Paraloid® EXL 2607 supplied by Rohm & Haas, USA, are commercially available or can be obtained in the way described in, for example, U.S. Pat. No. 4,419,496 or EP-A 45 357.

Preferably used are core/shell polymers containing a core selected from the group comprising polybutadiene, butadiene/styrene copolymers and butadiene/acrylonitrile copolymers and a shell selected from the group comprising polymers based on methyl methacrylate, cyclohexyl methacrylate, butyl acrylate, styrene, methacrylonitrile, vinyl acetate and vinyl alcohol.

Insofar as the core/shell polymers employed according to the invention are novel polymer compositions, they are also a subject of the present invention.

The amount of toughener which is added to the epoxy resin composition according to the invention is preferably up to 40% by weight, in particular up to 20% by weight, based on the epoxy resin a).

The toughener can also be used in a particularly preferred embodiment as a suspension in an epoxy resin.

As compound d), any compound can be used provided it has two active hydrogen atoms and is able to react with the epoxy resin a). Preferred compounds d) are those which are known to the person skilled in the art as pre-extension compounds for epoxy resins, for example biphenols, hydroxycarboxylic acids, dicarboxylic acids, disecondary amines or primary amines.

Examples of biphenols are: mononuclear diphenols (such as resorcinol), naphthalines containing two hydroxyl groups such as 1,4dihydroxynaphthalene, biphenyls and other binuclear aromatic compounds which have a methylene, isopropylidene, O, $SO_2$ or S bridge and contain two hydroxyl groups bound to the aromatic nuclei such as, in particular, bisphenol A, bisphenol F or bisphenol S; the benzene rings may also contain halogen atoms, such as tetrabromobisphenol A.

Examples of hydroxycarboxylic acids are α-hydroxycarboxylic acids such as glycolic acid or lactic acid, β-hydroxycarboxylic acids such as hydracrylic acid or phenolcarboxylic acids such as salicylic acid.

Examples of dicarboxylic acids are aliphatic dicarboxylic acids such as oxalic acid, malonic acid, succinic acid, glutaric acid, adipic acid, azelaic acid, sebacic acid or 3,6,9-trioxaundecanedioic acid or aromatic dicarboxylic acids such as phthalic acid, isophthalic acid, terephthalic acid or naphthalic acid or diesterdicarboxylic acids which can be obtained, for example, by reacting glycols, for example neopentyl glycol, with two equivalents of dicarboxylic acid anhydride such as, for example, tetrahydrophthalic anhydride.

Other suitable dicarboxylic acids are COOH-terminated polyesters which can be obtained, for example, by reacting diols, for example hexanediol, with a slight excess of dicarboxylic acid such as, for example, sebacic acid.

Preferred are COOH-terminated polyesters which can be obtained by reacting polyether polyols, for example Baygal® K 390 or Desmophen® 1900 U, with dimer fatty acids such as, for example Pripol® 1017.

Examples of disecondary amines which may be either aliphatic or aromatic are N,N'-diethylethylamine, piperazine or N,N'-dimethylphenylenediamine.

Examples of primary amines are aliphatic amines such as n-propylamine, n-butylamine, n-hexylamine or aromatic amines such as aniline or naphthylamine.

Preferred are biphenols, in particular bisphenol A, and dicarboxylic acids, in particular 3,6,9-trioxaundecanedioic acid.

Expediently up to 50% by weight, preferably up to 25% by weight, based on the epoxy resin a) of the compound d) is used.

For filled epoxy resin compositions according to the invention, the following fillers, for example, are suitable: mineral and fibrous fillers such as quartz powder, fused quartz, aluminium oxide, glass powder, mica, kaolin, dolomite, graphite, soot, and also carbon fibres and textile fibres. Preferred fillers are quartz powder, fused silica, aluminium oxide or dolomite.

The epoxy resin compositions according to the invention are prepared by methods known per se, for example with the aid of known mixing units (stirrers, kneaders, rollers or, in the case of solid substances or powders, in mills or dry mixers).

In this connection, it is unimportant whether the toughener is first mixed separately with the compound d) and is incorporated as a mixture into the resin/hardener system or whether the toughener or the compound d) is added individually, in which case the sequence is irrelevant.

Thus, for example, the toughener and the compound d) may be stirred into the liquid epoxy resin/anhydride hardener system.

The techniques of incorporation are known and are described, for example, in U.S. Pat. No. 4,778,851.

The epoxy resin compositions according to the invention are cured to form moulded bodies or the like at elevated temperature in a manner which is standard per se for anhydride hardeners. The curing can be carried out in one, two or more stages, the first curing stage being carried out at low temperature and the post-curing at higher temperature.

The present invention therefore also relates to the cured products which are obtainable by curing the epoxy resin compositions according to the invention in a manner which is standard per se.

The present invention also relates to a process for improving the toughness of epoxy resins, wherein a combination of a toughener with a compound d) is added to an unfilled or filled epoxy resin/anhydride hardener system and the system so obtained is cured in a manner which is standard per se.

The epoxy resin compositions according to the invention are eminently suitable as casting resins, laminating resins, moulding compounds, coating compounds and also as encapsulating systems for electrical and electronic components, and in particular as casting resins and encapsulating systems for electrical and electronic components.

Example A: Polymer I 202.7 g of polybutadiene latex (BL 2004 K supplied by Bayer AG) having a solids content of 59.2% and 397.3 g of deionised water are introduced under $N_2$ into a 1 l flask with plane ground joint fitted with double jacket, glass anchor stirrer, thermometer, condenser, circulating thermostat and $N_2$ connection and stirred at 100 rpm (revolutions per minute). The mixture is heated to 80° C.±1° C. After approximately 55 minutes, an internal temperature of 80° C. has been reached. Now the dropwise addition of 90.0 g of distilled methyl methacrylate (pure, supplied by Fluka, Switzerland) and a solution of 4.0 g of potassium peroxydisulfate and 3.5 g of sodium dodecylbenzenesulfonate in 110 ml of distilled water is started. After 3.5 hours, a homogeneous white emulsion is obtained. After a total of 6 hours 10 minutes, the addition of the methyl methacrylate and of the initiator is terminated.

Stirring is continued for a further 2 hours at 80° C. At the end of this time, 3 ml of a 20% emulsion of n-octadecyl 3-(3,5-di-tert-butyl-4-hydroxylphenyl)propionate are added to the homogeneous white emulsion and the whole is then cooled to room temperature. At room temperature the emulsion is also homogeneous and white in colour. It is filtered through glass wool. No agglomerates are present. The emulsion is diluted to 900 g, which results in a solids content of 22.5%. The emulsion thus obtained can be used as a toughener in two different ways:

as it is, ie. as a latex (polymer Ia)

coagulated and ground (polymer Ib).

For the purpose of coagulation, 700 g of the emulsion are heated with 1000 ml of deionised water to approximately 70° C. while stirring in a 2.5 l sulfonation flask. At 68° C., 100 ml of coagulating solution (100 g of $MgSO_4.7H_2O+850$ ml of deionised water+50 ml of glacial acetic acid) are added, after which heating is carried out to 90°–95° C. At an internal temperature of 73° C., the emulsion coagulates in very fine form. As soon as the internal temperature has reached 90° C., stirring is continued at 90°–95° C. for 1 hour. A very finely divided white suspension is now obtained. This is followed by cooling to room temperature, filtering, washing with water and drying in vacuum at 50°–60° C.

157.5 g of white product (96.4% of theory) are obtained.

Glass transition temperature Tg: −81° C. (TMA)

Shore D hardness (DIN 53 505): 51

Polymethyl methacrylate (PMMA) effectively grafted on: 71.5%* (determined by exhaustive extraction with CHCl₃. The homopolymerised PMMA is soluble in this solvent and is dissolved out).

A smaller quantity of the coagulated and worked-up polymer is ground in a ball mill for 24 hours.

EXAMPLES B and C: Polymers II & III

Two further core/shell polymers are synthesised analogously to Example A, starting from the same polybutadiene latex BL 20004 K.

The products are the polymers II and III.

Polymer II

Shore D hardness: 61

PMMA grafted on (effectively): 96.4%*

Polymer III

Shore D hardness: 66

PMMA grafted on (effectively): 146.3%*

* The values refer to the amount of PMMA (weight) of the shell in relation to the core.

The polymer II is isolated both in ground form (polymer IIa) and in spray-dried form (polymer IIb). In the latter case, the spray-drying is carried out directly from the emulsion with the aid of a Büchi® 190 spray dryer supplied by B üchi, Switzerland, the inlet temperature being 104° C. and the outlet temperature 69° C.

The polymer III is isolated only in spray-dried form (inlet temperature 104° C., outlet temperature 67° C.).

EXAMPLE D: Polymer IV 100 g of a solid crystalline epoxy resin based on isocyanurate having an epoxy content of 9.44 eq/kg are introduced into a 350 ml sulfonation flask having stirrer, condenser and thermometer and melted at 120° C. At an internal temperature of 122° C., 100 g of a carboxyl-terminated butadiene/acrylonitrile copolymer having an H⁺ equivalent/1944 g (Hycar® 1300×13 supplied by Goodrich, USA) are weighed out and added to the flask directly. At an internal temperature of 131° C. a brown, virtually clear melt is obtained. The progress of the reaction is monitored by measuring the epoxy content of the mixture. The reaction is continued at an internal temperature of 140° C. while stirring, until a measured epoxy content of 4.41 eq/kg is obtained. With a starting epoxy value of the mixture of 4.72, this corresponds to a decrease of 0.31 eq/kg (theoretical value 0.26). The product is poured off at a temperature of 140° C. Then the product is cooled to room temperature, during which process it solidifies.

EXAMPLE E: Polymers V–XV

The core/shell polymers listed in the table below are synthesised analogously to Example A, starting from the same polybutadiene latex BL 2004 K.

| Polymer | Monomers | % grafting-on | Shore D hardness |
|---|---|---|---|
| V | Methyl methacrylate/styrene 75:25 | 100 | 57 |
| VI | Methyl methacrylate/glycidyl methacrylate 75:25 | 100 | 59 |
| VII | Methylmethacrylate/vinyl acetate 75:25 | 100 | 54 |
| VIII | Styrene | 75 | 34 |
| IX | Vinyl acetate | 75 | 27 |
| X | Butyl methacrylate | 100 | 15 |
| XI | Butyl acrylate | 100 | 36 |
| XII | 2-Ethylhexyl methacrylate | 100 | 6 |
| XIII | Methacrylonitrile | 100 | 48 |
| XIV | Cyclohexyl methacrylate | 100 | 44 |
| XV | Isobutyl methacrylate | 100 | 42 |

EXAMPLE F: Suspension of the graft polymer from Example A in an epoxy resin 500 g of a liquid epoxy resin based on bisphenol A having an epoxy content of 5.35 eq/kg are introduced into a 2 l flask with plane ground joint having glass anchor stirrer and vacuum connection, and 100 ml of methyl ethyl ketone are added while stirring. 222.2 g of graft polymer emulsion from Example A having a solids content of 22.5% (=50.0 g of polymer I, 100% grafting-on) are added to the clear solution so obtained and stirring is carried out for 15 min. The homogeneous mixture is heated to approximately 60° C. and evacuated to 150–200 mbar, in which process a methyl ethyl ketone/water mixture is first distilled off and then water. Towards the end of the distillation, the temperature is raised to 80° C. and the pressure lowered to 40–50 mbar, the remaining water being removed in the course of 30 min. A homogeneous white suspension which is readily stirrable at 80° C. is obtained and is poured off after cooling to 50° C.

Yield: 546.2 g

Epoxy content: 4.86 eq/kg

Water content: 0.16% (determined by K. Fischer method)

Toughener content: 10 phr (based on the epoxy resin)

EXAMPLE G 120 g (100%) of methyl methacrylate are grafted on to 342.9 g of the butadiene/acrylonitrile copolymer latex Europrene® 2620 (acrylonitrile content 35%) having a solids content of 35.0% analogously to Example A.

Yield: 967 g of latex

Graft polymer content of the latex: 24.6%

Shore D hardness (graft polymer): 62

The latex obtained is processed with a liquid epoxy resin based on bisphenol A, epoxy content 5.35 eq/kg analogously to Example F to produce a suspension.

Yield: 547 g

Epoxy content: 4.86 eq/kg

Water content: 0.11% (determined by K. Fischer method)

Toughener content: 10 phr (based on the epoxy resin)

EXAMPLE H 120 g (100%) of methyl methacrylate are grafted on to 300 g of the butadiene/styrene copolymer latex Intex® 084 (styrene content 24%) having a solids content of 40.0% analogously to Example A.

Yield: 961 g of latex

Graft polymer content of the latex: 24.7%

Shore D hardness (graft polymer): 62

The latex obtained is processed with a liquid epoxy resin based on bisphenol A, epoxy content 5.35 eq/kg, analogously to Example F to produce a suspension.

Yield: 549 g

Epoxy content: 4.86 eq/kg

Water content: 0.07% (determined by K. Fischer method)

Toughener content: 10 phr (based on the epoxy resin)

EXAMPLE I 202.7 g of polybutadiene latex Baystal® 2004 K (solids content 59.2%) are mixed with 397.2 g of deionised water in a 1.5 l flask with plane ground joint having double jacket, glass anchor stirrer, thermometer and condenser, and heated to 80° C.±1° C. while stirring (1000 rpm). At 80° C., 23.0 g of hexanediol dimethacrylate (0.15 eq C—C double bonds/100 g of polybutadiene) and 30 ml of initiator solution were added in the course of 1 h. Stirring of the homogeneous emulsion is then continued for 1 h at 80° C. To determine the Shore hardness, a sample of the emulsion is coagulated and dried.

Polybutadiene latex 2004 K: Shore A hardness=41

Additionally crosslinked polybutadiene latex 2004 K: Shore A hardness=67

Methyl methacrylate (100%) is then grafted on to the modified (additionally crosslinked) polybutadiene analogously to Example A.

Yield: 937 g of latex

Graft polymer content of the latex: 26.9%

Shore D hardness (graft polymer): 64

The latex obtained is processed with a liquid epoxy resin based on bisphenol A, epoxy content 5.31 eq/kg analogously to Example F to produce a suspension.

Yield: 549 g

Epoxy content: 4.83 eq/kg

Water content: 0.13% (determined by K. Fischer method)

Toughener content: 10 phr (based on the epoxy resin)

EXAMPLE J: Suspension of a core/shell polymer in an epoxy resin a) Preparation of a core/shell polymer 202.7 g of polybutadiene latex (BL 2004 K supplied by Bayer AG) having a solids content of 59.2% and 397.3 g of deionised water are introduced under $N_2$ into a 1 l flask with plane ground joint fitted with double jacket, glass anchor stirrer, thermometer, condenser, circulating thermostat and $N_2$ connection and stirred at 100 rpm (revolutions per minute). The mixture is heated to 80° C.±1° C. After approximately 55 minutes, an internal temperature of 80° C. has been reached. Now the dropwise addition of 120.0 g of distilled methyl methacrylate (pure, supplied by Fluka, Switzerland) and a solution of 4.0 g of potassium peroxydisulfate and 3.5 g of sodium dodecylbenzenesulfonate in 110 ml of distilled water is started. After 3.5 hours, a homogeneous white emulsion is obtained. After a total of 6 hours 10 minutes, the addition of the methyl methacrylate and of the initiator is terminated.

Stirring is continued for a further 2 hours at 80° C. At the end of this time, 3 ml of a 20% emulsion of n-octadecyl 3-(3,5-di-tert-butyl-4-hydroxylphenyl)propionate are added to the homogeneous white emulsion and the whole is then cooled to room temperature. At room temperature the emulsion is also homogeneous and white in colour. It is filtered through glass wool. No agglomerates are present. The emulsion is diluted to 865 g, which results in a solids content of 27.2%. The emulsion thus obtained is used as a toughener.

b) Preparation of the suspension 600 g of hexahydrophthalic acid diglycidyl ester having an epoxy content of 5.6–6.2 eq/kg are introduced into a 2 l flask with plane ground joint having glass anchor stirrer and vacuum connection. 220.6 g of core/shell polymer emulsion from Example Ja) having a solids content of 27.2% are added and stirring is carried out for 15 min. The homogeneous mixture is heated to approximately 80° C. and evacuated to 150–200 mbar, in which process water is distilled off. Towards the end of the distillation, the pressure is lowered to 40–50 mbar, the remaining water being removed in the course of 30 min. A homogeneous suspension which is readily stirrable at 80° C. is obtained and is poured off after cooling to 50° C.

Epoxy content: 5.32 eq/kg

Toughener content: 10 phr (based on the epoxy resin)

EXAMPLE K: Preparation of a COOH-terminated polyester 450 g of polyether polyol Baygal® K 390 (supplied by Bayer, Germany; molecular weight: ~4,800; hydroxyl group content: 0.67 eq/kg), 300 g of polypropylene glycol Desmophen® 1900 U (supplied by Bayer, Germany; molecular weight: ~2,000, hydroxyl group content: 1.0 eq/kg), 340 g of $C_{18}$-unsaturated fatty acids Pripol® 1017 (supplied by Unichema, UK; a mixture of 80% dimer fatty acid and 20% trimer fatty acid, COOH-group content: 3.53 equ/kg) and 24.0 g 2,2-bis(4-hydroxycyclohexyl)propane are introduced under $N_2$ into a 1.5 l flask with plane ground joint fitted with stirrer, thermometer, condenser, distilling apparatus and $N_2$ connection. The mixture is heated to 205°–210° C. while stirring. Stirring of the colourless solution is then continued for 5 h at 205°–210° C. After storing at ambient temperature under $N_2$ overnight, the mixture is heated to 205°–210° C. again, evacuated to 300 mbar and stirred for 1 h, in which process water is distilled off. Pressure is then lowered to 200 mbar and the mixture is stirred for further 10 min. A homogenous light brown suspension is obtained and is poured off after cooling to 100° C.

Yield: 1088 g

Viscosity (25° C.): 9,440 mPa·s

Acid number: 29

EXAMPLE 1

Methyltetrahydrophthalic anhydride, bisphenol A, a core/shell toughener having a methyl methacrylate/butadiene/styrene copolymer core and a PMMA shell and having a particle size of 0.1–0.3 μm (Paraloid® EXL 2607 supplied by Rohm & Haas, USA) and also 1-methylimidazole are added in the amounts shown in Table 1 below to 100 parts by weight of a liquid epoxy resin based on bisphenol A having an epoxy content of 5.0–5.25 eq/kg and a viscosity at 25° C. of 9000–14000 mPa·s, and the mixture is mixed thoroughly by stirring, the imidazole component only being added to the mixture at the end.

Moulded bodies are produced with this mixture which are cured for 6 hours at 80° C. and then for 10 hours at 140° C. and the fracture toughness is then determined.

TABLE 1

| | Parts by weight |
|---|---|
| Epoxy resin | 100 |
| Methyltetrahydrophthalic anhydride | 62 |
| Core/shell toughener | 16.1 |
| Bisphenol A | 16.1 |
| 1-Methylimidazole | 0.5 |
| Fracture toughness $G_{IC}$ (Bend notch) [J/m$^2$] | 2032 |

Example 2: The filled epoxy resin system shown in Table 2 is used analogously to Example 1. Curing is carried out for 2 hours at 100° C. and then for 10 hours at 140° C.

TABLE 2

| | Parts by weight |
|---|---|
| Epoxy resin based on bisphenol A, epoxy eq. 5.0–5.25 kg | 100 |
| Methyltetrahydrophthalic anahydride | 62 |
| Paraloid ® EXL 2607 (Rohm & Haas, USA) | 16.1 |
| Bisphenol A | 16.1 |
| 1-Methylimidazole | 0.5 |
| Quartz powder W12 | 292 |
| Fracture toughness $G_{IC}$ (Double torsion) [J/m$^2$] | 1015 |
| Impact toughness (ISO) [kJ/m$^2$] | 15.8 |
| Flexural strength (ISO) [N/mm$^2$] | 126 |
| Extreme fibre extension (ISO) [%] | 2.25 |

Example 3: A filled epoxy resin system is used analogously to Example 2, the resin being an epoxy resin based on bisphenol A and cycloolefin (69.9% by weight of bisphenol A diglycidyl ether, 29.9% by weight of 3,4-epoxycyclohexylmethyl 3,4-epoxycyclohexanecarboxylate and 0.2% by weight of benzyltriethylammonium chloride) and having an epoxy content of 5.6–6.0 eq/kg and also a viscosity at 25° C. of 4200–6500 mpa·s.

The amounts used are shown in Table 3. Curing is carried out for 2 hours at 100° C. and then for 10 hours at 140° C.

TABLE 3

| | Parts by weight |
|---|---|
| Epoxy resin | 100 |
| Methyltetrahydrophthalic anhydride | 72.2 |
| Paraloid ® EXL 2607 | 10 |
| Bisphenol A | 18.7 |
| 1-Methylimidazole | 0.5 |
| Quartz powder W12 | 302.1 |
| Fracture toughness $G_{IC}$ (Double torsion) [J/m$^2$] | 647 |
| Impact toughness (ISO) [kJ/m$^2$] | 10.6 |
| Flexural strength (ISO) [N/mm$^2$] | 123 |
| Extreme fibre extension (ISO) [%] | 1.8 |

Example 4: 55 parts by weight of the polymer IV from Example D, 25 parts by weight of bisphenol A, 80.1 parts by weight of Nadic Methyl Anhydride and 0.5 parts by weight of 1-methylimidazole are added to 45 parts by weight of a solid epoxy resin based on isocyanurate having an epoxy content of 9.3–10.0 eq/kg and mixed.

Curing is carried out for 10 hours at 80° C., followed by 4 hours at 180° C. and 8 hours at 220° C.

The results of the toughness test are shown in Table 4.

TABLE 4

| | Example 4 |
|---|---|
| Impact toughness [kJ/m$^2$] | 23 |
| Bending angle (to fracture) [°<] | 51 |
| Glass transition temperature Tg [°C.] | 219 |

Example 5: Methyltetrahydrophthalic anhydride and bisphenol A are added to 110 parts by weight of epoxy resin/graft polymer suspension from Example F at 60° C. and mixed. While stirring vigorously, quartz powder preheated to 140° C. is added. 1-Methylimidazole is added to the mixture heated to approximately 80° C. and the mixture is stirred thoroughly. The casting compound is subjected to a vacuum of 5 mbar for 10 min and then cast. Curing is carried out for 2 hours at 100° C. and then for 10 hours at 140° C.

The amounts used and the results of the toughness test are shown in Table 5.

TABLE 5

| | Parts by weight |
|---|---|
| Epoxy resin/graft polymer suspension | 110* |
| Methyltetrahydrophthalic anhydride | 62 |
| Bisphenol A | 18.6 |
| 1-Methylimidazole | 0.5 |
| Quartz powder W12 | 287 |
| Fracture toughness $G_{IC}$ (Double torsion) [J/m$^2$] | 595 |
| Impact toughness (ISO) [kJ/m$^2$] | 12.9 |
| Flexural strength (ISO) [N/mm$^2$] | 130 |
| Extreme fibre extension (ISO) [%] | 2.0 |

*10 parts by weight of toughener to 100 parts by weight of epoxy resin

Example 6: Instead of bisphenol A as component d) 3,6,9-trioxaundecanedioic acid is used analogously to Example 5.

The amounts used and the results of the toughness test are shown in Table 6.

TABLE 6

| | Parts by weight |
|---|---|
| Epoxy resin/graft polymer suspension | 110* |
| Methyltetrahydrophthalic anhydride | 62 |
| 3,6,9-Trioxaundecanedioic acid | 18.1 |
| 1-Methylimidazole | 0.5 |
| Quartz powder W12 | 286 |
| Fracture toughness $G_{IC}$ (Double torsion) [J/m$^2$] | 697 |
| Impact toughness (ISO) [kJ/m$^2$] | 12.1 |
| Flexural strength (ISO) [N/mm$^2$] | 126 |
| Extreme fibre extension (ISO) [%] | 1.8 |

*10 parts by weight of toughener to 100 parts by weight of epoxy resin

Example 7: An unfilled epoxy resin system containing the same epoxy resin based on bisphenol A and cycloolefin is used analogously to Example 3.

The amounts used and the results of the toughness test are shown in Table 7.

TABLE 7

|  | Parts by weight |
|---|---|
| Epoxy resin | 100 |
| Methyltetrahydrophthalic anhydride | 70.9 |
| Polymer II from Example A | 19.64 |
| Bisphenol A | 19.51 |
| 1-Methylimidazole | 0.5 |
| Fracture toughness $G_{IC}$ (Double torsion) [J/m$^2$] | 765 |
| Impact toughness (ISO) [kJ/m$^2$] | 35.7 |
| Flexural strength (ISO) [N/mm$^2$] | 120 |
| Extreme fibre extension (ISO) [%] | 6.7 |

Examples 8–11: Methyltetrahydrophthalic anhydride and 3,6,9-trioxaundecanedioic acid are added to 110 parts by weight of epoxy resin/graft polymer suspension from Example H at 60° C. and mixed.

The amounts used and the results of the toughness test are shown in Table 8.

TABLE 8

| Example | Parts by weight | | | |
|---|---|---|---|---|
|  | 8 | 9 | 10 | 11 |
| Epoxy resin/graft polymer suspension | 110* | 110* | 110* | 110* |
| Methyltetrahydrophthalic anhydrided | 62.0 | 66.5 | 71.0 | 71.0 |
| 3,6,9-Trioxaundecanedioic acid | 18.1 | 15.1 | 12.1 | 12.1 |
| 1-Methylimidazole | 0.5 | 0.5 | 0.5 | 0.5 |
| Quartz powder W12 | — | — | — | 290.4 |
| Fracture toughness $G_{IC}$ (Double torsion) [J/m$^2$] | 2222 | 1684 | 1375 | 700 |
| Impact toughness (ISO) [kJ/m$^2$] | 69.7 | 62.7 | 59.0 | 12.2 |
| Flexural strength (ISO) [N/mm$^2$] | 124 | 125 | 124 | 122 |
| Extreme fibre extension (ISO) [%] | 11.0 | 10.2 | 10.9 | 1.9 |

*10 parts by weight of toughener to 100 parts by weight of epoxy resin

Example 12: A mixture of 85 parts by weight of methylhexahydrophthalic anhydride, 5 parts by weight of a dicarboxylic acid prepared by reacting 2 mol of tetrahydrophthalic anhydride with 1 mol of neopentyl glycol, and 0.2 part by weight of 1-methylimidazole is homogenised at 60° C. and 100 parts by weight of epoxy resin based on bisphenol A having an epoxy content of 5.25–5.40 eq/kg are added at the same temperature. 10 parts by weight of the toughener Paraloid® EXL 2600 (Rohm & Haas, USA, particle size: 0.1–0.3 μm) and 300 parts by weight of quartz powder W12 are added in portions to the mixture while stirring vigorously. After addition has been completed, the temperature is raised to 80° C. in the course of 10 min and the reaction mixture is evacuated to approximately 40–50 mbar for 10 min.

The mixture is then cast to produce test pieces. The curing is carried out for 2 h at 100° C. and then for 16 h at 140° C.

The test results are shown in Table 9.

TABLE 9

|  | Example 12 |
|---|---|
| Glass transition temp. $T_g$ (DSC) [°C.] | 146 |
| Tensile strength (ISO) [N/mm$^2$] | 46 |
| Fracture toughness (Double torsion) [J/m$^2$] | 610 |
| Impact toughness (ISO) [kJ/m$^2$] | 10.7 |
| Flexural strength (ISO) [N/mm$^2$] | 116 |
| Elongation at fracture (ISO) [%] | 2.06 |

EXAMPLE 13

A mixture of hexahydrophthalic anhydride, benzyldimethylamine and the COOH-terminated polyester of Example K are heated to 50°–60° C. and added to 110 parts by weight of epoxy resin/graft polymer suspension from Example J at 60° C. While stirring vigorously, quartz powder is added and the mixture is heated to 60°–80° C. The casting compound is subjected to a vacuum of 5 mbar for 10 min and then cast. Curing is carried out for 2 hours at 100° C. and then for 16 hours at 140° C.

The amounts used and the results of the toughness test are shown in Table 10.

TABLE 10

| Example 13 | Parts by weight |
|---|---|
| Epoxy resin/graft polymer suspension | 110 |
| Hexahydrophthalic anhydride | 89 |
| COOH-terminated polyester | 10 |
| Benzyldimethylamine | 0.5 |
| Quartz powder W 12 | 314 |
| Glass transition temp. $T_g$ (DSC) [°C.] | 109 |
| Fracture toughness (Double torsion) [J/m$^2$] | 762 |
| Impact toughness (ISO) [kJ/m$^2$] | 12.0 |
| Flexural strength (ISO) [N/mm$^2$] | 141 |

EXAMPLE 14

Instead of the COOH-terminated polyester of Example K a COOH-terminated polyester prepared from 10 moles sebacic acid and 11 moles hexanediol (molecular weight: 3136) is used analogously to Example 13.

The amounts used and the results of the toughness test are shown in Table 11.

TABLE 11

| Example 14 | Parts by weight |
|---|---|
| Epoxy resin/graft polymer suspension | 110 |
| Hexahydrophthalic anhydride | 82 |
| COOH-terminated polyester | 15 |
| Benzyldimethylamine | 0.5 |
| Quartz powder W 12 | 311 |
| Glass transition temp. $T_g$ (DSC) [°C.] | 94 |
| Fracture toughness (Double torsion) [J/m$^2$] | 1222 |
| Impact toughness (ISO) [kJ/m$^2$] | 13.0 |
| Flexural strength (ISO) [N/mm$^2$] | 146 |

What is claimed is:

1. An epoxy resin composition which comprises
   a) at least one epoxy resin containing on average more than one 1,2-epoxy group per molecule, which is liquid and of low viscosity,
   b) an anhydride hardener for the epoxy resin a), c) a toughener, and d) a hydroxycarboxylic acid, a dicarboxylic acid, or a biphenol, which is a mononuclear diphenol, dihydroxy naphthaline, dihydroxy biphenyl or another binuclear aromatic compound which has a methylene, isopropylidene, O, $SO_2$ or S bridge and contains two hydroxyl groups bound to the aromatic nuclei and wherein the benzene rings may also contain halogen atoms.

2. An epoxy resin composition according to claim 1 which additionally contains a filler.

3. An epoxy resin composition according to claim 1, wherein the epoxy resin a) is a diglycidyl ether of bisphenol A, diglycidyl ether of bisphenol F or a cycloaliphatic diepoxide or is a polyglycidyl ester of a polycarboxylic acid.

4. An epoxy resin composition according to claim 1, wherein the epoxy resin a) contains, on average, two 1,2-epoxy groups per molecule.

5. An epoxy resin composition according to claim 1, wherein the anhydride hardener b) is a linear aliphatic polymeric anhydride or a cyclic carboxylic acid anhydride.

6. An epoxy resin composition according to claim 5, wherein the anhydride hardener b) is a cyclic carboxylic acid anhydride.

7. An epoxy resin composition according to claim 1 which additionally contains an accelerator for the anhydride hardener b).

8. An epoxy resin composition according to claim 1, wherein the toughener is a core/shell polymer.

9. An epoxy resin composition according to claim 8, wherein the shell part of the polymer contains no groups which react with epoxy groups.

10. An epoxy resin composition according to claim 1, wherein the amount of the toughener c) is up to 40% by weight, based on the epoxy resin a).

11. An epoxy resin composition according to claim 8, wherein the core/shell polymer has a particle size of 0.05–30 µm.

12. An epoxy resin composition according to claim 9, wherein the core of the core/shell polymer contains polybutadiene.

13. An epoxy resin composition according to claim 1, wherein compound d) contains two phenolic OH groups.

14. An epoxy resin composition according to claim 13, wherein compound d) is bisphenol A.

15. An epoxy resin composition according to claim 1, wherein the amount of the compound d) is up to 50% by weight, based on the epoxy resin a).

16. An epoxy resin composition according to claim 2, wherein the filler is a mineral or fibrous filler.

17. An epoxy resin composition according to claim 16, wherein the filler is quartz powder, fused silica, aluminium oxide or dolomite.

18. A cured product obtained by curing an epoxy resin composition according to claim 1.

19. A process for improving the toughness of epoxy resins, wherein a combination of a toughener with a compound d) according to claim 1 is added to an unfilled or filled epoxy resin/anhydride hardener system.

* * * * *